(12) United States Patent
Wang et al.

(10) Patent No.: US 12,352,617 B2
(45) Date of Patent: Jul. 8, 2025

(54) METHOD AND SYSTEM FOR ECCENTRIC LOAD ERROR CORRECTION

(71) Applicants: Mettler-Toledo (Changzhou) Measurement Technology Ltd., Changzhou (CN); Mettler-Toledo (Changzhou) Precision Instruments Ltd., Changzhou (CN); Mettler-Toledo International Trading (Shanghai) Co., Ltd., Shanghai (CN)

(72) Inventors: Shenhui Wang, Changzhou (CN); Yujuan Zha, Changzhou (CN); Song Zhang, Changzhou (CN); Genjun Ji, Changzhou (CN); Qiang Fu, Changzhou (CN); Jinkang Han, Changzhou (CN); Jinli Li, Changzhou (CN)

(73) Assignees: Mettler-Toledo (Changzhou) Measurement Technology Ltd., Changzhou (CN); Mettler-Toledo (Changzhou) Precision Instruments Ltd., Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 280 days.

(21) Appl. No.: 18/016,004

(22) PCT Filed: Jul. 8, 2021

(86) PCT No.: PCT/CN2021/105305
§ 371 (c)(1),
(2) Date: Jan. 13, 2023

(87) PCT Pub. No.: WO2022/012416
PCT Pub. Date: Jan. 20, 2022

(65) Prior Publication Data
US 2023/0266158 A1   Aug. 24, 2023

(30) Foreign Application Priority Data

Jul. 15, 2020   (CN) .......................... 202010678720.9

(51) Int. Cl.
 *G01G 23/01*   (2006.01)
 *G01G 23/00*   (2006.01)

(52) U.S. Cl.
 CPC ......... *G01G 23/012* (2013.01); *G01G 23/002* (2013.01)

(58) Field of Classification Search
 CPC ..... G01G 23/00; G01G 23/002; G01G 23/012
 See application file for complete search history.

(56) References Cited

U.S. PATENT DOCUMENTS

| | | | | |
|---|---|---|---|---|
| 4,799,558 A | * | 1/1989 | Griffen | ................ G01G 3/1412 177/25.14 |
| 4,909,338 A | * | 3/1990 | Vitunic | ................. G01G 23/01 73/1.13 |

(Continued)

FOREIGN PATENT DOCUMENTS

CN   105973443 B   9/2018

*Primary Examiner* — Natalie Huls
(74) *Attorney, Agent, or Firm* — Standley Law Group LLP; Jeffrey S. Standley; Adam J. Smith

(57) ABSTRACT

Methods and systems for eccentric load error correction are disclosed. A plurality of weighing data sets for a weight having a mass value are obtained, where the weight is loaded at different positions on a weighing platform of a weighing device. Differences between each of the weighing data sets and the average value of the plurality of weighing data sets or the mass value of the weight are calculated. Sensor correction coefficients are calculated and updated when the maximum absolute value of the differences exceeds a pre-set threshold. The weighing data sets are updated. The above steps are repeated until the absolute values of all the differences are less than the pre-set threshold.

12 Claims, 2 Drawing Sheets

(56) References Cited

U.S. PATENT DOCUMENTS

| | | | | |
|---|---|---|---|---|
| 6,801,866 B1* | 10/2004 | Yarian | ............... | G01G 23/01 |
| | | | | 73/1.13 |
| 9,612,149 B2* | 4/2017 | Burkhard | ............ | G01G 19/414 |
| 11,519,777 B2 | 12/2022 | Wu et al. | | |
| 2013/0319072 A1* | 12/2013 | Laubstein | ............. | G01G 23/01 |
| | | | | 73/1.13 |

* cited by examiner

METHOD AND SYSTEM FOR ECCENTRIC LOAD ERROR CORRECTION

BACKGROUND OF THE INVENTION

Technical Field

The present invention relates to a method and system for eccentric load error correction of a weighing device.

Background Art

When objects are loaded at different positions on a weighing platform of a weighing device, different types of forces act on a weighing sensor. While axial loading is desirable for accurate load measurement, it is not always the case. In addition to the axial loads, the weighing sensors are regularly subject to bending stresses, which induce eccentric load errors in weight measurement. Especially in a multi-sensor weighing device, such as a vehicle scale or a weighbridge, the eccentric load errors become more pronounced because the parameters of various sensors are inconsistent, thus influencing the output values of weighing sensors resulting in eccentric load errors.

Eccentric load correction in a weighing device is realized by adjusting correction coefficients of weighing sensors. In a multi-sensor weighing device, the correction coefficients associated with the various sensors are adjusted as well to achieve eccentric load correction, thus reducing eccentric load errors in weighing.

At present, the correction coefficients of the sensors are calculated and adjusted by sets of weighing eccentric load test data obtained through the method of loading and calibrating at different positions on the weighing platform of a weighing device. Known correction methods calculate the sum of squared differences between weighing data sets output by the sensors and the actual masses of weights, which are then used for correcting eccentric load errors by calculating and adjusting the correction coefficients of the sensors so that the sum of the squared differences is minimized. That is, the normal distribution concept in statistical analysis is used to characterize the eccentric load errors in the form of the sum of squared differences, so as to minimize the sum of squared differences of various weighing values by adjusting the correction coefficients.

In the existing error correction methods, in order to reduce the number of samples or the precision of correction, various algorithms or equations are also used to calculate the minimum sum of squared differences and corresponding sensor correction coefficients.

However, using the minimum sum of squared differences approach cannot effectively minimize the eccentric load error in the weighing device. As the weighing data sets come from different positions on the weighing platform, the weighing data sets in practice do not strictly conform to a normal distribution statistically. Since the weighing data sets obtained do not conform to the normal distribution, the correction coefficients obtained using the known correction methods cannot minimize the error in each set of test data, thus making it impossible to achieve high-precision and accurate correction of eccentric load errors in a weighing device.

SUMMARY

The technical solution provided by the present invention is a method and a system for eccentric load error correction that aims to overcome the problem of inaccurate eccentric load error correction caused as a result of the manner in which the correction coefficients are calculated using the principle of minimum sum of squared differences for eccentric load correction in prior art weighing devices.

The present invention solves the aforementioned technical problem using the following technical solution in which there is provided a method for eccentric load error correction comprises the steps of: obtaining a plurality of weighing data sets for a weight having a mass value when said weight is loaded at different positions on a weighing platform of a weighing device; calculating differences between each of the plurality of weighing data sets and an average value of the plurality of weighing data sets or the mass value of the weight; and calculating sensor correction coefficients based on the calculated differences; and updating said sensor correction coefficients when a maximum absolute value of the calculated differences exceeds a pre-set threshold, then updating the weighing data sets until absolute values of the calculated differences are less than the pre-set threshold.

Further, weighing data sets for each of the weights having different mass values when said weights are loaded at different positions on the weighing platform are obtained respectively; when the weights having different mass values are loaded, calculating differences between various weighing data sets and the average values of the weighing data sets or the mass values of the weights are calculated respectively; then a linear parameter is calculated by using the average values of the weighing data sets when the weights having different masses are loaded; and when the maximum absolute values of the calculated differences exceeds the pre-set threshold, the sensor correction coefficients are calculated by using the linear parameter and updated; then the weighing data sets are updated until the absolute values of the calculated differences are less than the pre-set threshold.

Still further, when the differences exceed a pre-set threshold range, sensor correction coefficients are calculated and updated, and the weighing data sets are updated until all the differences are within the pre-set threshold range.

Still further, when the maximum absolute value of the calculated differences exceeds the pre-set threshold, the sensor correction coefficients are calculated and updated based on the calculated differences, then the weighing data sets are updated until the absolute values of all the calculated differences are within a pre-set threshold range.

Further, the convergence rate of the maximum absolute value of the calculated differences or the convergence rate of the maximum absolute value of the calculated differences is calculated to determine whether the maximum absolute value exceeds a rate threshold; the sensor correction coefficients are calculated and updated, and the weighing data sets are updated until the convergence rate of the maximum value of the calculated differences is less than the rate threshold.

Still further, the convergence rate is calculated by using a difference between a slope calculated based on the maximum value of the calculated differences, and a previous maximum value of the calculated differences and a slope calculated in immediate prior instance.

Still further, when the maximum absolute value of the differences exceeds a pre-set threshold, the sensor correction coefficients in the weighing device are calculated and updated; then the weighing data and the number of cycle times are updated until the absolute values of all the calculated differences are less than the pre-set threshold or the number of cycle times exceeds a cycle threshold.

A system for eccentric load error correction comprises: a processing device and a communication device, wherein the communication device obtains a plurality of weighing data sets from a weighing device when a weight having a mass value is loaded at different positions on a weighing platform; the processing device calculates differences between each of the weighing data sets and an average value of the plurality of weighing data sets or the mass value of the weight; and the processing device calculates sensor correction coefficients using the calculated differences and updates the sensor correction coefficients in the weighing device when the maximum absolute values of the calculated differences exceeds a pre-set threshold, and then updates the weighing data sets until the absolute values of the calculated differences are less than the pre-set threshold.

Further, the communication device obtains weighing data sets for weights of different mass values when loaded at different positions on the weighing platform respectively; when weights of different masses are loaded, the processing device calculates the differences between each of the weighing data sets and the average value of the plurality of weighing data sets or the mass values of the weights respectively; the processing device calculates a linear parameter by using the average value of the plurality of weighing data sets when the weights of different mass values are loaded; and the processing device uses the linear parameter thereby calculates and updates the sensor correction coefficients in the weighing device when the maximum absolute value of the calculated differences exceeds a pre-set threshold, and then updates the weighing data sets until the absolute values of the calculated differences are less than the threshold.

Still further, the processing device calculates and updates the sensor correction coefficients in the weighing device when the calculated differences exceed a pre-set threshold range, and updates the weighing data sets until the calculated differences are within the threshold range.

Further, the processing device calculates the convergence rate of the maximum value of the differences or the convergence rate of the maximum absolute value of the differences to determine whether the convergence rate exceeds a rate threshold, and calculates and updates the sensor correction coefficients, and updates the weighing data sets until the convergence rate of the maximum value of the differences is less than the rate threshold.

Still further, the processing device calculates the convergence rate using a difference between a slope calculated based on the maximum value of the calculated differences, and a previous maximum value of the calculated differences and a slope calculated in immediate prior instance.

Still further, the processing device calculates and updates sensor correction coefficients in the weighing device when the maximum absolute values of the calculated differences exceeds a pre-set threshold, then updates the weighing data sets and the number of cycle times until the absolute values of all the calculated differences are less than the threshold or the number of cycle times exceeds a cycle threshold.

A storage medium is characterized by comprising a stored program that, when running, controls an apparatus where the storage medium executes the aforesaid method for eccentric load error correction.

The positive improvement effects of the present invention are as follows: The method for eccentric load error correction in the present invention comprises: directly dealing with eccentric load errors so as to calculate the sensor correction coefficients in the weighing device and substitute them into eccentric load corrected weighing data sets, thereby ensuring minimum weighing error of the weighing data, and realizing more accurate correction of eccentric load errors.

In addition, the present invention also uses a linear relationship among weighing data sets for multiple sets of weights to help improve the accuracy and efficiency of eccentric load error correction.

DETAILED DESCRIPTION OF EMBODIMENTS

Figure 1:
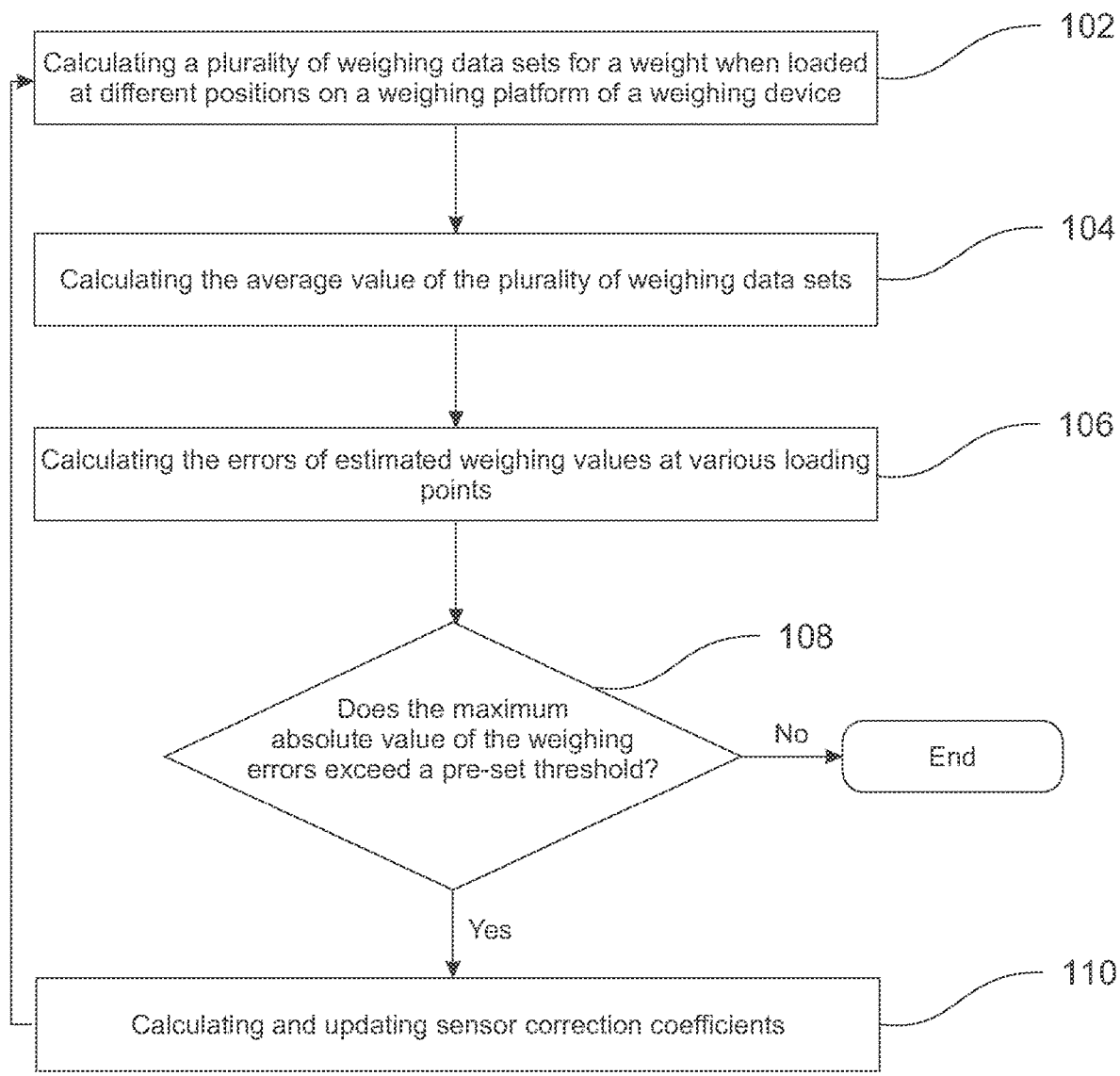
FIG. 1 is a flowchart of a method for eccentric load correction of a weighing device according to an embodiment of the present invention.
Figure 2:
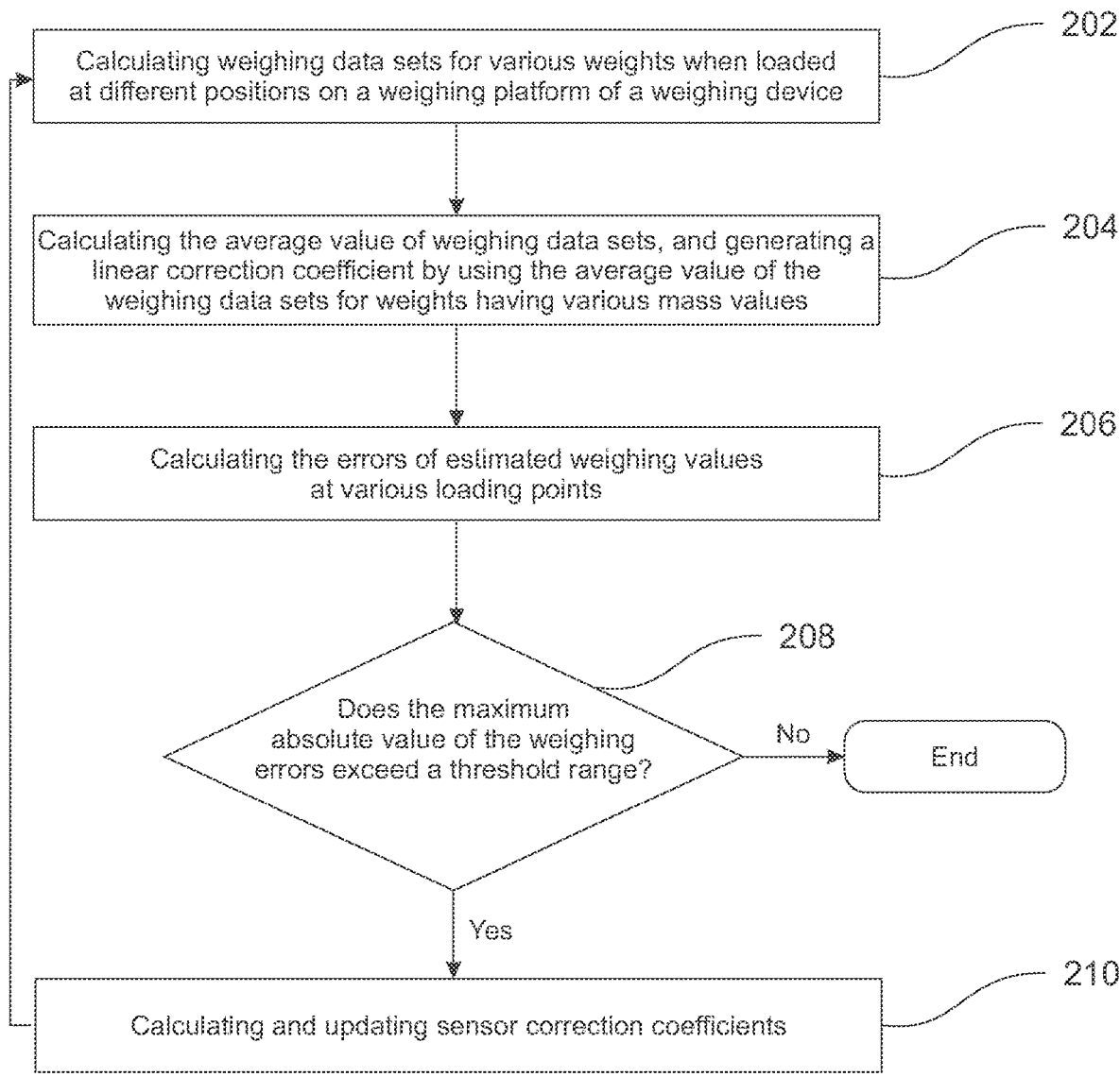
FIG. 2 is a flowchart of a method for eccentric load correction of a weighing device according to another embodiment of the present invention.

The present invention will be further described in detail by way of exemplary embodiments. But, the embodiments described herein should not be construed to limit the scope of this invention.

In an embodiment, a method for eccentric load error correction of a weighing device comprises the steps of: obtaining weighing data sets for weights having different mass values when loaded at different positions on a weighing platform of the weighing device respectively; calculating differences between various weighing data sets for weights of various mass values and the average value of the various weighing data sets respectively; then calculating a linear parameter by using the average value of mass values of various weights; and calculating and updating sensor correction coefficients, by using the linear parameter or the like, when the maximum absolute value of the differences exceeds a pre-set threshold, then updating the weighing data sets of the weighing device, until all the differences are less than the pre-set threshold.

In this embodiment, eccentric load errors of the weights at various loading points are directly calculated, and sensor parameters of the weighing device are directly corrected by using the linear parameter or the like. In this embodiment, the concept of weighing error is directly used as a guide so as to reduce the weighing error of the weighing device. Compared with the prior art, this embodiment will not cause the problem of inaccurate correction of eccentric load errors because the minimum sum of squared differences does not strictly conform to the concept of standard distribution in statistical analysis. Moreover, in this embodiment, the comparison between the calculated differences and the pre-set threshold is used to ensure that the eccentric load errors after the updating of the correction coefficients are converged, thereby ensuring the accuracy of weighing.

In this embodiment, a linear relationship among these average values is constructed by calculating the average mass value of different weights, thereby obtaining the linear parameter.

In a variant, when the differences exceed a pre-set threshold range, the sensor correction coefficients are calculated and updated, and the weighing data sets are updated until all the differences are within the pre-set threshold range. Moreover, the differences can also be obtained directly by calculating the differences between weighing data sets obtained from selected weights and the mass values of the weights, that is, differences corresponding to various weights can be obtained by calculating the differences between weighing data for the various weights and the mass values of various weights respectively.

In another variant, the maximum value of the differences calculated this time and the maximum value of the differences calculated during an immediate prior instance are used to calculate a slope. When the difference between a slope calculated instantaneously and a slope calculated during an immediate prior instance exceeds a pre-set rate threshold, the sensor correction coefficients are calculated and updated, and the weighing data sets of the weighing device are updated too. Then the difference is calculated again. The difference between a slope calculated instantaneously and the slope calculated during an immediate prior instance is calculated in turn, and if the difference in slopes thus calculated exceeds the pre-set rate threshold, the above calculation steps are repeated until the calculated slope difference is less than the rate threshold. That is, in this embodiment, the slope difference is calculated twice in succession to obtain the convergence rate of the difference, and then the change in the convergence rate is used to determine whether the difference is continuously converging. These steps are repeated over and over again until the convergence rate of the difference is very low. In other words, when the slope difference is less than the threshold, the eccentric load error is very small, so the configuration of correction coefficients is completed.

In yet another variant, when the maximum absolute value of the calculated differences exceeds a pre-set threshold, a processing device calculates and updates the sensor correction coefficients in the weighing device, and records the number of cycle times of updating the sensor correction coefficients while updating the weighing data. If the number of cycle times exceeds a pre-set number of times, a system stops the correction, thereby avoiding an excessive system processing time and reducing the system burden. If the number of cycle times does not exceed the pre-set number of times and the maximum absolute value of the calculated differences falls within the threshold range at the same time, the system completes updating the sensor correction coefficients, as described in the previous embodiment.

In one embodiment of the system for eccentric load correction, the weighing device comprises six weighing sensors, and a weight having mass W is used for testing at different loading positions on the weighing platform. The output of each weighing sensor corresponding to different loading positions is (xj, n), where j denotes a test loading position point, and n denotes each of the weighing sensors, the maximum value of j being 9 in this embodiment.

The calculation formula (11) for weighing output of the weighing sensors is as follows:

$$W = K * \sum_{n=1}^{N} P_n * (x_n - Xz_n) \tag{11}$$

where W is an estimated weighing value, K is a linear correction coefficient, Pn is an eccentric load correction coefficient associated with a weighing sensor, xn is the output of the nth weighing sensor, and Xzn is a zero output of the nth weighing sensor associated with zero calibration.

The specific implementation of the method for eccentric load error correction in the system comprises the steps of calculating, in a weighing data calculation step S102, weighing data set for a weight having a mass value when the weight is loaded at different positions on a weighing platform of a weighing device. In this embodiment, six sets of weighing sensor data for a given weight at different loading points is substituted into formula (11). Then an estimated weighing value at each loading position point can be obtained using formula (12):

$$W_j = K * \sum_{n=1}^{6} P_n * (x_{j,n} - Xz_n) \tag{12}$$

In an average value calculation step S104, the average value A of various weighing data sets is calculated using the formula (13):

$$A = \sum_{j=1}^{9} W_j \tag{13}$$

In a difference calculation step S106, the error Ej of the estimated weighing value at each loading point is calculated using the formula (14).

$$E_j = W_j - A \tag{14}$$

In an updating determination step S108, the absolute values of the differences Ej is searched for the maximum absolute value Ejmax of the weighing errors to determine whether Ejmax exceeds a pre-set threshold TH.

In case the maximum absolute value Ejmax exceeds the pre-set threshold TH, a correction coefficient updating step S110 is performed. A corresponding estimated weighing value (xjmax, n) is found according to the maximum absolute value Ejmax, and the sensor correction coefficients are calculated and updated according to formula (15) in which:

$$P_nNew = P_nOld - k_1 \times (E_{jmax}/A) \times (k_2 \times (x_{jmax,n} - Xz_n)/A) \tag{15}$$

where $k_1$ and $k_2$ are pre-set parameters of the formula (15), PnOld is an eccentric load correction coefficient associated with a weighing sensor before updating, and PnNew is an eccentric load correction coefficient associated with a weighing sensor after updating.

Then, the weighing device uses PnNew as the current eccentric load correction coefficient Pn of a weighing sensor. Returning to step S102, the estimated weighing values at various loading positions on the loading platform are recalculated. Then, the above steps are repeated until all the differences Ej are less than the pre-set threshold TH, and the flow ends.

In another embodiment of the system for eccentric load correction, the weighing device comprises 8 weighing sensors and uses 5 weighing weights each having a different mass value, whereby a weight having a mass value Wi is used for testing at different loading positions on the weighing platform. The output of each weighing sensor corresponding to different loading positions is (xi,j, n), where 'i' denotes a weight of a different mass, 'j' denotes a test weight loading position, and n denotes each of the weighing sensors 1-8, and the maximum value of j is 12 in this embodiment.

The calculation formula (21) for the weighing output of the weighing sensors is as follows:

$$W = K * \sum_{n=1}^{N} P_n * (x_n - Xz_n) \tag{21}$$

where, W is an estimated weighing value, K is a linear correction coefficient, Pn is an eccentric load correction coefficient associated with a weighing sensor, xn is the output of the nth weighing sensor, and Xzn is a zero output of the nth weighing sensor associated with zero calibration.

The specific implementation of the method for eccentric load error correction in the system comprises the steps of calculating, in a weighing data calculation step S202, weighing data sets for various weights when loaded at different positions on a weighing platform of a weighing device, respectively. In this embodiment, 8 sets of weighing sensor data for each weight at different loading points on the weighing platform are substituted into formula (21). Then, an estimated weighing value of each loading position can be obtained using the formula (22):

$$W_{i,j} = K * \sum_{n=1}^{8} P_n * (x_{i,j,n} - Xz_n) \tag{22}$$

In an average value calculation step S204, the average value Ai of various weighing data sets is calculated using the formula (23).

$$A_i = \sum_{j=1}^{12} W_j \tag{23}$$

In step S204, a linear correction coefficient Kline is also generated simultaneously by using the average value Ai of the weighing data sets corresponding to different weights.

In a difference calculation step S206, the error Ei,j of the estimated weighing value at each loading point is calculated using the formula (24).

$$E_{i,j} = W_{i,1} - A_i \tag{24}$$

In an updating determination step S208, it is determined whether the difference Ei,j is within a range [Emin, Emax].

In the updating determination step S208, when the determination result, that is the difference Ei,j exceeds the range [Emin, Emax], a correction coefficient updating step S210 is performed to determine an estimated weighing value (xi,j, nout) corresponding to Ei,jout exceeding the range, and the sensor correction coefficients are calculated and updated according to formula (25).

$$P_n New = P_n Old - k_1 \times (E_{i,j} out / A_i) \times (K_{line} \times (x_{i,j,n} out - Xz_n) A_i) \tag{25}$$

where, k1 is a pre-set parameter of the formula, PnOld is an eccentric load correction coefficient associated with a weighing sensor before updating, and PnNew is an eccentric load correction coefficient associated with a weighing sensor after updating.

Then, the weighing device uses PnNew as the current eccentric load correction coefficient Pn of a weighing sensor. Returning to step S202, the estimated weighing values at various loading position are recalculated. Then, the above steps are repeated until all the differences Ei,j are within the threshold range [Emin, Emax], thus terminating the flow.

It can be learned from the description of the procedure of the method for eccentric load error correction above that, those skilled in the art may clearly understand that the present invention may be implemented by means of software plus a necessary hardware platform. Based on such an understanding, the technical solution of the present invention, in essence or the contribution to the prior art, may be embodied in the form of a software product, and the computer software product may be stored in a storage medium, including but not limited to a ROM/RAM (Read-Only Memory/Random Access Memory), a magnetic disk, and an optical disk, which includes several instructions that cause one or more computer devices (which may be a personal computer, a server, or a network device) to carry out the methods described in various embodiments or some parts in the embodiment of the present invention.

The calculation procedure in the present invention may be described in a general context of a computer executable instruction executed by a computer, for example, a program module. Generally, the program module includes a program, an object, a component, a data structure, etc. for performing a specific task or implementing a specific abstract data type. The present invention may also be practiced in distributed computing environments where a task is performed by a remote processing device that is connected over a communication network. In the distributed computing environments, the program module may be located in local and remote computer storage media, including a storage device.

The invention claimed is:

1. A method for correcting an eccentric load error of a weighing device having a weighing platform with one or more sensors, said method comprising the steps of:
   obtaining, in a communication device, at least a first plurality of weighing data sets from each of the one or more sensors by loading a first weight having a first mass value at different positions on the weighing platform of the weighing device, each weighing data set comprising weight data from each of the one or more sensors; and
   using a processing device to:
      calculate differences between each of the plurality of weighing data sets and an average value of either the plurality of weighing data sets or the mass value of the weight; and
      calculate sensor correction coefficients based on calculated differences; and
      update said sensor correction coefficients when a maximum absolute value of the calculated differences exceeds a pre-set threshold, and subsequently update the weighing data sets until absolute values of the calculated differences are less than the pre-set threshold;
   obtaining at least one further plurality of weighing data sets by loading at least one further weight, the weights having different mass values when said weights are loaded at the plurality of different positions on the weighing platform; and
   using the processing device, for the first, and each further, plurality of weighing data sets, to:
      calculate differences between each of the weighing data sets and the average values of either the plurality of weighing data sets or the mass values of the weights;
      calculate a linear parameter by using the average values of the weighing data sets when the weights having different masses are loaded; and
      calculate the sensor correction coefficients by using the linear parameter.

2. The method of claim 1, further comprising using the processing device, for the first, and each further, plurality of weighing data sets, to calculate and update the sensor correction coefficients when the differences exceed a pre-set threshold range, and subsequently update the weighing data sets until all the differences are within the pre-set threshold range.

3. The method of claim 1, further comprising using the processing device, for the first, and each further, plurality of weighing data sets, to calculate and update the sensor correction coefficients based on the calculated differences when the maximum absolute value of the calculated differences exceeds the pre-set threshold, and subsequently update the weighing data sets until the absolute values of all the calculated differences are within a pre-set threshold range.

4. The method of claim 1, further comprising using the processing device, for the first, and each further, plurality of weighing data sets, to:
calculate a convergence rate of at least one of: the maximum absolute value of the calculated differences or calculating the convergence rate of the maximum absolute value of the calculated differences;
determine whether the maximum absolute value exceeds a rate threshold; and
calculate and update the sensor correction coefficients, and subsequently update the weighing data sets until the convergence rate of the maximum absolute value of the calculated differences is less than the rate threshold.

5. The method of claim 4, further comprising using the processing device, for the first, and each further, plurality of weighing data sets, to calculate the convergence rate using a difference between: a slope calculated based on the maximum value of the calculated differences, and a previous maximum value of the calculated differences and a slope calculated in an immediate prior instance.

6. The method of claim 1, further comprising using the processing device, for the first, and each further, plurality of weighing data sets, to calculate and update the sensor correction coefficients in the weighing device when the maximum absolute value of the differences exceeds the pre-set threshold, and subsequently updating the weighing data sets and number of cycle times until: the absolute values of the calculated differences are less than the pre-set threshold or the number of cycle times exceeds a cycle threshold.

7. A system for correcting an eccentric load error of a weighing device having a weighing platform with one or more sensors, said system comprising:
a communication device configured to obtain at least a first plurality of weighing data sets from each of the one or more sensors of the weighing device when a first weight having a first mass value is loaded at a plurality of different positions on the weighing platform, wherein each weighing data sets comprises weight data from each of the one or more sensors;
a processing device, programmed with software instructions which when executed configure the processing device to:
calculate differences between each of the first plurality of weighing data sets and an average value of either the first plurality of weighing data sets or the first mass value of the first weight;
calculate sensor correction coefficients based on the calculated differences; and
update the sensor correction coefficients when a maximum absolute value of the calculated differences exceeds a pre-set threshold, and subsequently update each of the weighing data sets until the absolute values of the calculated differences are less than the pre-set threshold;
wherein the communication device is configured to obtain at least one further plurality of weighing data sets, from placement of at least one further weight having a different mass value when loaded at the different positions on the weighing platform; and
wherein the processing device is programmed with software instructions, which when executed, configure the processing device to use all obtained weighing data sets to:
calculate differences between each of the further weighing data sets and the average values of either the plurality of weighing data sets or the mass values of the weights;
calculate a linear parameter by using the average values of the weighing data sets when the weights having the different mass values are loaded; and
calculate and update the sensor correction coefficients by using the linear parameter.

8. A storage medium, comprising a stored program that, when running, controls a weighing device where the storage medium executes the method for correcting an eccentric load error as claimed in claim 1.

9. The system of claim 7, wherein the processing device is programmed with software instructions which when executed configure the processing device to calculate and update the sensor correction coefficients in the weighing device when the calculated differences exceed a pre-set threshold range, and update the weighing data sets until the calculated differences are within the threshold range.

10. The system of claim 7, wherein the processing device is programmed with software instructions which when executed configure the processing device to:
calculate a convergence rate of at least one of: the maximum absolute value of the differences and the convergence rate of the maximum absolute value of the differences;
determine whether the convergence rate exceeds a rate threshold; and
calculate and update the sensor correction coefficients, and update the weighing data sets until the convergence rate of the maximum absolute value of the differences is less than the rate threshold.

11. The system of claim 10, wherein the processing device is programmed with software instructions which when executed configure the processing device to calculate the convergence rate using a difference between: a slope calculated based on the maximum value of the calculated differences, and a previous maximum value of the calculated differences and a slope calculated in an immediate prior instance.

12. The system of claim 7, wherein the processing device is programmed with software instructions which when executed configure the processing device to calculate and update the sensor correction coefficients in the weighing device when the maximum absolute value of the calculated differences exceeds a pre-set threshold, and subsequently update the weighing data sets and number of cycle times until the absolute values of all the calculated differences are less than the threshold or the number of cycle times exceeds a cycle threshold.

* * * * *

UNITED STATES PATENT AND TRADEMARK OFFICE
CERTIFICATE OF CORRECTION

| | | |
|---|---|---|
| PATENT NO. | : 12,352,617 B2 | Page 1 of 1 |
| APPLICATION NO. | : 18/016004 | |
| DATED | : July 8, 2025 | |
| INVENTOR(S) | : Shenhui Wang et al. | |

It is certified that error appears in the above-identified patent and that said Letters Patent is hereby corrected as shown below:

In the Specification

In Column 7, Line 31, please delete "$E_{i,j}=W_{i,1}-A_i$" and insert -- $E_{i,j} = W_{i,j} - A_i$ --.

In Column 7, Lines 42-43, please delete "$P_nNew=P_nOld-k_1\times(E_{i,j}out/A_i)\times(K_{line}\times(x_{i,j,n}out-Xz_n) A_i)$" and insert -- $P_nNew = P_nOld - k_1 \times (E_{i,j}out/A_i) \times (K_{line} \times (x_{i,j,n}out - Xz_n)/A_i)$ --.

Signed and Sealed this
Twelfth Day of August, 2025

Coke Morgan Stewart
*Acting Director of the United States Patent and Trademark Office*